United States Patent [19]

Bekedam

[11] Patent Number: 5,476,525
[45] Date of Patent: Dec. 19, 1995

[54] STEAM CONDENSATE RECOVERY COMPONENT

[76] Inventor: Martin Bekedam, 19059 N. 88th Ave., Westbrook Village, Peoria, Ariz. 85382

[21] Appl. No.: 204,761

[22] Filed: Mar. 1, 1994

[51] Int. Cl.$^6$ .................................................. B01D 45/06
[52] U.S. Cl. ............... 55/218; 55/385.4; 55/DIG. 23; 95/244; 96/156; 96/189; 122/441; 137/156; 137/171
[58] Field of Search ................................. 55/218, 385.4, 55/DIG. 23; 122/441, 442; 96/156, 188, 189; 137/156, 171, 173, 174, 197, 201; 95/244

[56] References Cited

U.S. PATENT DOCUMENTS

| | | | |
|---|---|---|---|
| 2,078,288 | 4/1937 | Sherman | 122/442 X |
| 2,097,401 | 10/1937 | Dunn | 137/173 X |
| 2,107,551 | 2/1938 | Simpson | 137/173 X |
| 2,317,467 | 4/1943 | Kirschenbaum et al. | 137/174 X |
| 2,489,345 | 11/1949 | Welch, Jr. | 122/442 X |
| 2,663,286 | 12/1953 | Worn | 122/442 X |
| 2,689,018 | 9/1954 | Kittredge | 95/244 |
| 4,494,692 | 1/1985 | Dobias | 55/218 X |
| 4,867,767 | 9/1989 | Yokoyama | 55/DIG. 23 |
| 5,310,417 | 5/1994 | Bekedam | 96/157 |

*Primary Examiner*—Richard L. Chiesa
*Attorney, Agent, or Firm*—Bielen, Peterson & Lampe

[57] ABSTRACT

A steam condensate recovery component particularly useful for pressurized deaerator units, the recovery component being a vertical extension pipe of thermally conductive material connected to a system air vent and extending into the atmosphere. The extension pipe includes a thermally controlled steam trap at the distal end of the extension pipe for blocking escape of steam and allowing return of recovered condensate to the deaerator unit.

5 Claims, 1 Drawing Sheet

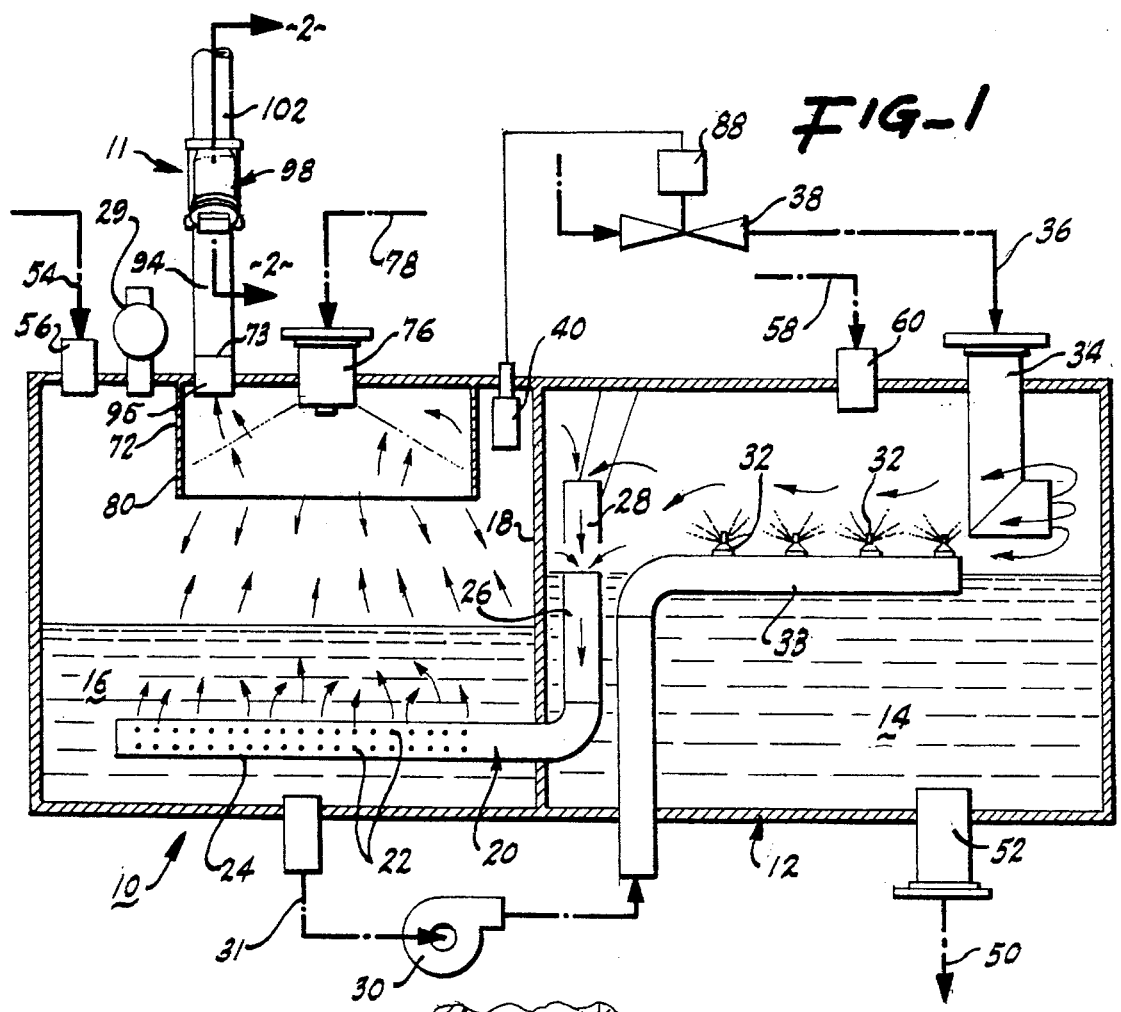
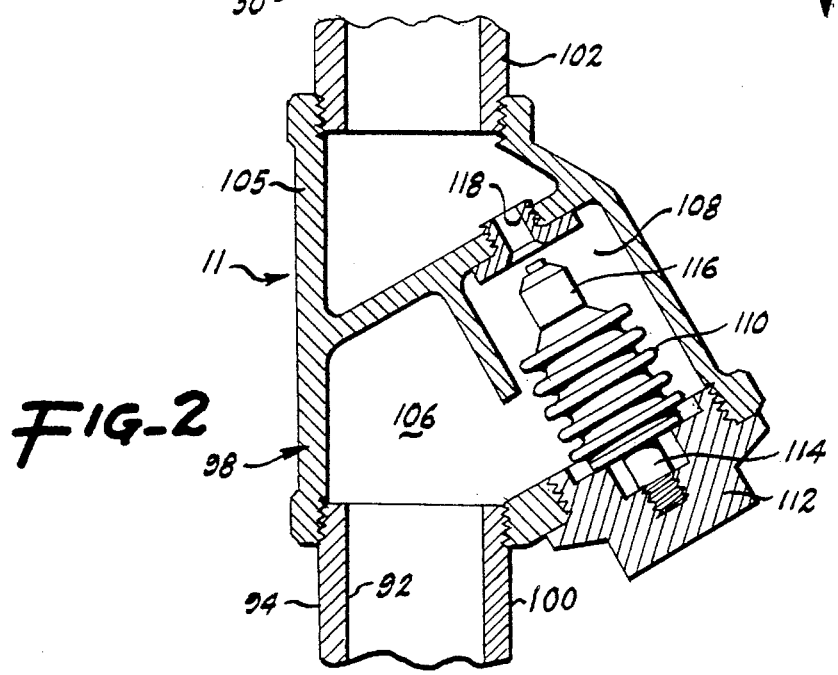

STEAM CONDENSATE RECOVERY COMPONENT

BACKGROUND OF THE INVENTION

This invention relates to an auxiliary vent component that is to be added to a pressurized deaerator unit in a boiler feedwater system. The vent component is designed to eliminate non-condensible gases from the boiler feedwater system while preventing escape of steam during the purging process. In particular, the auxiliary component comprises a steam condensate recovery component for the gas vent in pressurized deaerator units. Generally, deaerator units that are not directly vented to atmosphere are classified as pressurized deaerators. The pressurized deaerators include safety vents to prevent excessive internal pressures and a non-condensible gas metering vent that provides a substantial degree of safety during use. The use of a condensate recovery component in a pressurized deaerator is desireable because the condensate can be directly returned to the deaerator unit with minimal loss of thermal energy. The auxiliary steam condensate recovery component proposed, is used in the deaerator unit of pressurized boiler feedwater systems where operating characteristics allow recovered steam condensate to be returned to the feedwater system as preheated return water.

A deaerator unit is a device to remove non-condensible gases from the feedwater that is supplied to a boiler unit. Non-condensible gases are generated in a system through chemical reactions with the high temperature feedwater tubes of a boiler, or admitted with the supply of makeup water from a water source. In particular, carbon dioxide is generated from carbonates present in circulating water. Air, carbon dioxide and other non-condensible gases must be continuously purged from the feedwater system. Substantial effort has been expended for development of highly efficient systems for stripping and purging to atmospheric such non-condensible gases from the circulating water in a deaerator unit.

In general, deaerators are rated for dissolved gas content as either 0.03 cc per liter or 0.005 cc per liter deaerators. The latter rated deaerator is the most effective in removing dissolved gases. In the final purge of the non-condensible gases from the deaerator unit, steam is frequently carried with the non-condensible gases and vented to the atmosphere with the resultant loss of the thermal energy from the heat content of the lost condensate. Furthermore, the requirement for addition of makeup water from an ambient temperature source not only requires preheating, but the stripping of dissolved gases from the added makeup water. In a typical pressurized deaerator unit of ordinary efficiency, approximately 1% of the steam used in the deaeration process is lost. In a boiler operating at a steam rate of 100,000 pounds per hour that obtains 100% of its makeup water from an ambient temperature source, it is estimated that 16,000 pounds per hour of steam is required for preheating the makeup water. With a hypothetical boiler efficiency of 80%, and a heating cost of 0.4 dollars per therm, the yearly cost from thermal losses from escaping steam is approximately $8,000 per year, per unit.

In the deaerator unit disclosed as an exemplar for inclusion of the subject steam condensate recovery component, a highly efficient system has been devised to purge non-condensible gases from the deaerator unit. Although designed in part to substantially reduce losses of vapor and condensible steam, steam loss can virtually be reduced to zero by the addition of the subject steam condensate recovery component. It is to be understood that the efficient deaerator disclosed is used to describe the best mode contemplated for use of the steam recovery component, but that any conventional pressurized deaerator unit can be equipped with the steam recovery component where recovered condensate can be returned to the unit.

SUMMARY OF THE INVENTION

The steam condensate recovery component for deaerator units is an auxiliary component that can be added to existing deaerator units or included on new units. The condensate recovery component is connected to the non-condensible gas vent and is preferably a vertical, thermally-conductive, extension pipe that allows escaping steam carried with non-condensible gases to condense on the inner walls of the extension pipe and return by gravity to the deaerator unit. While the extension need not be exactly vertical, it is preferred that it be oriented such that the condensed water returns by gravity as quickly after condensation as possible to minimize thermal loss. At the end of the extension pipe of the condensate recovery component is a thermally operated trap that passes only non-condensible gases that may have passed through an internal vent condenser in the deaerator unit.

The steam condensate recovery component is shown in a preferred configuration mounted on an efficient pressurized deaerator unit devised by this inventor. It is to be understood that other embodiments of the condensate recovery component incorporating the concepts disclosed herein may be devised by those skilled in the art from this disclosure and may be used on other pressurized deaerator units of the general type disclosed herein with little, if any, modification.

The deaerator unit described in conjunction with the steam condensate recovery component of this invention, is a pressurized deaerator with a divided water vessel that includes separate sections under pressure in order to maximize deaeration and maintenance of elevated feed water temperatures.

The deaeration unit described, is particularly suitable for industrial processing equipment in which steam demand and condensate return may be irregular. The deaerating unit may be used in combination with select heat exchangers and flash condensers to maximize efficiencies in the water and steam circuits.

The steam condensate recovery component is externally mounted on the pressurized deaerator unit above the internal vent condenser, and forms an extension of the vent to atmosphere. To maintain pressure in a deaerator unit, the installed vent of the deaerator unit usually includes a gas discharge metering device such as a constricted passage in the vent. Escape of the steam through the vent is ordinarily discharged to the atmosphere along with the unwanted non-condensible gases. The recovery component devised adapts a steam trap mounted at the end of an extension pipe that forms the condenser for the steam. The trap includes a small flow orifice that functions as a metering device for gas flow.

In the internal vent condenser, the cool makeup water together with any pumped return condensate is sprayed in a conical pattern around the opening to the vent to condense any vagrant steam and flush any water vapor carried in the non-condensible gases as they escape through the vent. Escaping steam condenses in the recovery component, returns through the vent opening in the internal vent condenser and falls to the water of the venting section together with any gravity returned condensate from other sources. This water is mixed with water in the venting section and eventually circulated to the water in the heating section for continuous reduction of the dissolved gas content in the water available for supply to the steam system.

BRIEF DESCRIPTION OF THE DRAWINGS

FIG. 1 is a cross sectional schematic view of the steam condensate recovery component installed on an exemplar pressurized deaerator.

FIG. 2 is an enlarged cross sectional view of the condensate recovery component taken on the lines 2—2 in FIG. 1.

DETAILED DESCRIPTION OF THE PREFERRED EMBODIMENTS

The deaerator unit shown in FIG. 1 is an advanced model invented by this inventor and is used as an example of one preferred type of deaerator unit on which the steam recovery component is added. It is to be understood that the steam recovery component 11 is useable on a wide variety of pressurized deaerator units of this general type including standard, single vessel deaerator units.

The deaerator unit 10 of FIG. 1 is constructed of a water vessel 12 divided into two sections, a heating section 14 and a venting section 16. Separating the heating section 14 and the venting section 16 is a centrally located wall 18.

A sparge pipe 20 is passed through the central wall 18. The sparge pipe 20 passes pressurized gases from the heating section 14 to the bottom of the pressurized venting section 16 wherein a plurality of holes 22 in a horizontal segment 24 of the sparge pipe allow the gases to bubble up through the water maintained in the venting section of the deaerator unit. The sparge pipe 20 has a vertical segment 26 in the heating section 14 that functions as an overflow stand pipe. The stand pipe segment 26 allows the water level in the heating section to be maintained constant relative to the water level in the venting section. Excess water is recycled back from the heating section to the venting section through the sparge pipe 20. The stand pipe segment 26 has an extension 28 above the stand pipe segment 26 to draw gases from the upper part of the heating section 14 where heated gases collect. The sparge pipe 20, acts as a pressure balance mechanism such that any sudden excess pressure into the heating section will blow any standing water through the sparge pipe 20 for direct line communication with the venting section. An emergency relief valve 29 prevents any design pressure from being exceeded in the event of a malfunction of a system element.

Water is cycled to the heating section by a small circulating pump 30 which draws water from the cooler, lower strata of the venting section 16 and circulates it through a circulation conduit 31 to a series of spray nozzles 32 in a horizontal segment 33 of the circulation conduit 31 arranged at water level. Pressurized steam from the steam boiler enters through elbow 34 to directly heat and deaerate the incoming spray of circulation water from the spray nozzles 32 of the circulation line 34.

Steam enters through a steam supply line 36 that has a supply control valve 38 that is pressure regulated by valve control 88. The supply control valve 38 is controlled by a pressure control 40 in the venting section 16 of the deaerator unit 10. Therefore, when the internal pressure drops below a desired control setting, such as five pounds, the supply control valve 38 admits additional steam to the heating section. An optimum pressure and hence temperature can be selected for the system requirements and the use to which the deaerator is applied. For example, a water temperature slightly above 225° Fahrenheit in the heating section provides an efficiently operating temperature for deaeration in both sections.

The lower temperature circulating water drawn from the bottom level of the venting section, is transferred to the gaseous upper level of the heating section 14 where superheated steam at an elevated temperature of approximately 240° Fahrenheit is mixed by direct contact with the water spray flashed down to about 227° Fahrenheit for final deaeration before gases pass through the sparge pipe to the venting section.

As the water is continuously cycled, any contained non-condensible gases are continually stripped by the operation of the steam contact. The water in the heating section 14 thereby becomes increasingly purged of non-condensible gases. Feed water for the steam boilers is drawn through a steam supply line 50 with a short stand pipe 52 at the bottom of the heating section of the deaerator unit. Condensate returned by gravity from the steam circuit is returned through a condensate inlet line 54 to an inlet 56 at the top of the vent section of the deaerator unit. Condensate under pressure, collected in traps in the steam circuit, is returned through inlet line 58 and inlet 60 at the top of the heating section of the deaerator unit.

To compensate for water loss in the steam supply circuit, makeup water is provided from a water supply (not shown) through a water supply line 78, together with pumped condensate and any supplemental circulating water, to an internal vent condenser in the venting section of the deaerator unit. The cool water mix is supplied to the vent condenser 72 through a spray nozzle 76 at the end of the water supply line 78. The spray nozzle 76 directs a fine conical spray of cool water at a cylindrical shield 80. Uncondensed gases that are passed through the sparge pipe rise in the venting section to the vent condenser 72 where condensible steam passing through the conical spray is condensed by the cool spray water. The non-condensible gases pass through the spray and are eventually vented to the atmosphere. The cool water spray that is supplied from the water supply may itself have non-condensible gases which are released during the spray process or which are subsequently released as the spray water falls to the water in the vent section of the deaerator unit and is heated. Eventually, water containing residual non-condensible gases is circulated to the heating section where the non-condensible gases are released by mixing with the supplied steam.

The efficiency of the deaerator unit is improved by the addition of the steam condensate recovery component 11. The steam condensate recovery component 11 is a thermally conductive, vertical extension pipe 94, preferably two feet in length, added to an enlarged diameter vent fitting 95. The extension pipe 94 is connected to the vent fitting 95 by conventional pipe fittings or in the preferred embodiments, by a weld 73. While the efficiency of the deaerator unit 10 has been maximized for stripping non-condensible gases from the water contained in the unit by the continuous circulation between the venting section 16 and the heating section 14, only one shot is provided for stripping steam and vapor from the gases in the venting section by the conical water spray from the spray nozzle 76 in the vent condenser 72. Steam and water vapor in small but yet economically significant quantities pass through the vent condenser 72 and are ordinarily lost to atmosphere during pressurized releases of gases.

The vertical vent extension pipe 94 is exposed along its length to the ambient temperature of the atmosphere and cools and condenses the rising steam, which together with any escaping water vapor collects on the inside wall 92 of the pipe 94. The collected water beads and runs down the wall of the pipe by gravity, to return to the venting section of the deaerator unit. The return water is close to the condensation temperature and does not require preheating providing a valuable saving in heating costs. Additionally, because the water does not contain the mineral salts of source water for water makeup, additional savings are realized by avoiding any makeup water preconditioning.

It is desirable to operate the control systems for the designed deaerator units such that the temperature in the heating section is approximately 227° Fahrenheit. Elevating the temperature assists in purging any non-condensible gases from the water.

With the vent section 16 raised in pressure and hence temperature, improved deaerating or improved boiler feedwater capacity can be developed with the same size unit, since deaeration occurs in both sections. However, because the venting section 16 is under pressure, some means must be included to restrict the volume of gases, including steam, that would otherwise be continuously vented.

The steam condensate recovery component 11 is designed to trap the steam that passes through the vent condenser 72. The extension pipe 94 includes a steam trap 98 proximate the end of the vertical pipe segment 94. An outlet-pipe segment 102 is preferably added to the steam trap 98 for final discharge. The outlet-pipe may extend to the outside of any building in which the deaerator unit is housed where desired.

The steam trap 98, shown in detail in FIG. 2, includes a housing 105 with a gas entry passage 106 that leads to a bellows chamber 108 in which is positioned a thermal bellows 110. The thermal bellows 110 is mounted to a housing access cap 112 by a rigid stem 114. The bellows 110 contains pure water in a vapor form with a vapor pressure closely correlated with the effective spring force of the bellows 110 required to urge a poppet 116 against a small valve opening 118 to form a closure when the water vapor in the bellows expands on heating.

The size of valve opening 118 is selected to provide the proper constriction for metering of gases from the pressurized deaerator unit. Because of the displacement of the trap 98 from the venting section of the unit, the gases have cooled, and the bellow has a thermal response characteristic selected to remain open while cooled non-condensible gases are purged. Steam and water vapor rising in the vertical pipe segment 100 condense and collect on the inside wall 92 of the pipe segment 100 and return to the deaerator unit.

If steam rises to the point it contacts the bellows 110, the bellows immediately heats, thermally expanding the internal vapor, and hence the bellows, thereby seating the poppet 116 against the valve opening 118 and closing the escape passage.

Only when the trapped steam and vapor cools and condenses, leaving only non-condensible gases in the bellows chamber 108 does the bellows contract, opening the release passage for escape of gases. In this manner, the valve mechanism of the steam trap is biased to remain open until the thermal conditions change. The heat of the steam contacting the bellows expands the bellows closing the escape passage. The escape passage remains closed until thermal conditions change such that the bellows contracts, thereby opening the passage. This thermal change occurs when non-condensible gases collect around the bellows. The gases being displaced from the thermal source of the deaerator unit cool, thereby cooling the bellows and opening the escape passage for release of the gases.

Although the steam trap is of a convention design, its adaptation to a steam condensate recovery component for recovering steam that passes an internal vent condenser in a deaerator unit is a new application that solves the vexing problem of steam loss through the vent in pressurized venting systems.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a pressurized deaerator unit having an internal vent condenser with a vent for venting non-condensible gases stripped from boiler feedwater used in a boiler system, a steam condensate recovery component comprising a vent extension pipe of thermally conductive material connected to the vent of the deaerator unit to provide an extended passage for venting non-condensible gases, the extension pipe having a pipe segment that extends into the air and having an orientation that returns condensate by gravity to the deaerator unit, the pipe segment having an end with a steam trap having a valve mechanism that passes non-condensible gas and blocks passage of steam.

2. The steam condensate recovery component of claim 1 wherein the steam trap valve mechanism includes a constricted valve opening and valve closure means for closing the valve opening in the presence of steam.

3. The steam condensate recovery component of claim 2 wherein the steam trap is mounted to the distal end of the vent extension pipe and includes an extension pipe segment with one end mounted to the steam trap and with a distal end open to atmosphere.

4. The steam condensate recovery component of claim 2 wherein the steam trap closure means includes a valve poppet wherein the valve opening is blockable by the valve poppet, a bellows chamber, and, a bellows member mounted in the bellows chamber and connected to the poppet, wherein the bellows member is constructed with vapor pressure means for expanding the bellows member and blocking the valve opening by the poppet when the bellows member is heated by steam and for retracting the poppet from the valve opening when the bellow is cooled on contact of the bellows member with non-condensible gases in the bellows chamber.

5. The steam condensate recovery component of claim 2 wherein the pipe segment has an inside wall and steam and water vapor condense on the inside wall of the pipe segment, and return by gravity to the deaerator unit.

\* \* \* \* \*